United States Patent
Jiang

[11] Patent Number: 6,128,954
[45] Date of Patent: Oct. 10, 2000

[54] SPRING FOR A RESONANCE RING OF AN ANGULAR RATE SENSOR

[75] Inventor: George Qin Jiang, Kokomo, Ind.

[73] Assignee: Delco Electronics Corporation, Kokomo, Ind.

[21] Appl. No.: 09/216,368

[22] Filed: Dec. 18, 1998

[51] Int. Cl.[7] .................... G01P 9/04; G01P 15/14
[52] U.S. Cl. .................... 73/504.13; 73/504.12; 73/504.18
[58] Field of Search .................... 73/504.18, 504.12, 73/504.13, 514.32, 1.37, 1.77, 862.625, 862.626, 862.629, 862.632, 862.636, 862.637, 862.641, 862.642, 504.02; 361/283.4

[56] References Cited

U.S. PATENT DOCUMENTS

| | | | |
|---|---|---|---|
| 5,450,751 | 9/1995 | Putty et al. | 73/504.18 |
| 5,487,305 | 1/1996 | Ristic et al. | 73/514.32 |
| 5,528,937 | 6/1996 | Dufour | 73/514.32 |
| 5,547,093 | 8/1996 | Sparks | 216/2 |
| 5,777,226 | 7/1998 | Ip | 73/514.38 |
| 5,831,162 | 11/1998 | Sparks et al. | 73/504.12 |
| 5,864,064 | 1/1999 | Kano et al. | 73/514.36 |
| 5,872,313 | 2/1999 | Zarabadi et al. | 73/497 |
| 5,889,207 | 3/1999 | Lutz | 73/504.13 |
| 5,915,276 | 6/1999 | Fell | 73/504.13 |

*Primary Examiner*—Helen C. Kwok
*Attorney, Agent, or Firm*—Jimmy L. Funke

[57] ABSTRACT

A motion sensor having a sensing ring and electrodes formed on or in a surface region of a substrate, such as a silicon chip. The sensing ring is supported above the substrate by a number of spring members extending radially from a hub, so that the ring has an axis of rotation through the hub. The electrodes are formed to closely surround the ring, with some of the electrodes being adapted to induce vibration in the ring, while others detect angular and radial deflections of the ring. Finally, the spring members are substantially S-shaped with substantially C-shaped first and second portions having different radii of curvature. Configuring the spring members to have two portions of different radii of curvature substantially produces in the sensing ring the elliptical vibration mode shape of an ideal ring.

18 Claims, 4 Drawing Sheets

SPRING FOR A RESONANCE RING OF AN ANGULAR RATE SENSOR

FIELD OF THE INVENTION

The present invention generally relates to motion sensing devices. More particularly, this invention relates to a spring for a resonance ring gyroscope, in which the spring configuration improves the performance and durability of the ring and sensor.

BACKGROUND OF THE INVENTION

Motion sensors, which include gyroscopes and their components (e.g., angular rate sensors and accelerometers), are widely used in consumer electronics products such as VCR cameras, and in aerospace and automotive applications such as safety control systems and navigational systems. Examples of automotive applications for gyroscopes include traction control, ride stabilization and global position systems. Electromechanical and electronic motion sensors have been widely used in the automotive industry to detect an automobile's deceleration. More recently, sensors that employ an electrically-conductive, micromachined plated metal or silicon sensing element have been developed which can be integrated with bipolar/CMOS/BiCMOS circuits on a silicon wafer.

An example of a plated metal surface micromachine is disclosed in U.S. Pat. No. 5,450,751 to Putty et al., assigned to the assignee of this invention. The disclosed micromachine is formed by a metal plating technique in cooperation with a mold that defines the shape of the micromachine on the surface of a wafer. Putty et al. further disclose a novel configuration for the micromachine, which includes a resonating metal ring and spring system. Two embodiments of Putty's sensor are shown in FIGS. 1, 2 and 3. The sensor 10 shown in FIGS. 1 and 2 includes a ring 14 that is supported by a number of arcuate springs 16 radially extending from a center post or hub 18, all of which are formed on a sensing wafer 12. The ring 14 is surrounded by a number of equi-angularly spaced electrode structures 20 formed on the wafer 12 in close proximity to the perimeter of the ring 14. The ring 14 and electrode structures 20 are electrically conductive, so that the ring 14 and electrodes 20 are capacitively coupled. The sensor 30 of FIG. 3 is similar to that of FIGS. 1 and 2, with a ring 34 supported by a number of arcuate springs 36 from a central hub 32. The difference between the two embodiments is the shape of the springs 16 and 36. The springs 16 of FIG. 1 are C-shaped, essentially semicircular with a constant radius of curvature. In contrast, the springs 36 of FIG. 3 are S-shaped, essentially formed by two C-shaped portions having equal radii of curvature.

A variation of the sensor disclosed by Putty et al. is described in U.S. Pat. No. 5,547,093 to Sparks, which teaches an electrically-conductive, micromachined silicon sensing element formed by etching a single-crystal silicon wafer or a polysilicon film on a silicon or glass handle wafer. A sensor disclosed in U.S. Pat. No. 5,872,313 to Zarabadi et al. is also based on Putty et al., but has a sensing ring and electrodes with interdigitized members. The positions of the interdigitized members relative to each other enable at least partial cancellation of the effect of differential thermal expansion of the ring and electrodes, reducing the sensitivity to temperature variations in the operating environment of the sensor.

All of the above sensors operate on the basis of capacitively sensing movement of their rings toward and away from their sensing electrodes. More particularly, referring to the embodiment of FIGS. 1 and 2, some of the electrode structures 20 operate as drive electrodes to drive the ring 14 into resonance, while other electrode structures 20 are configured as sensing electrodes to capacitively sense the proximity of the ring 14, which will vary due to Coriolis forces that occur when the resonating ring 14 is subjected to rotary motion. In FIG. 1, eight electrode structures 20 are equi-angular spaced along the perimeter of the ring 14, so that adjacent structures 20 are positioned forty-five degrees apart from each other. The drive electrodes induce two identical elliptically-shaped vibration modes in the ring 14 to sense ring rotation, or angular rate. One of the elliptically-shaped modes, the primary mode, is driven electrostatically by the drive electrodes. In the elliptical vibration modes of the ring 14, only tangential deflection of the ring 14 occurs at the nodes (i.e., radial motion is zero), while only radial deflection occurs at what are termed the antinodes (i.e., tangential motion is zero). In an ideal ring, the nodes and antinodes are spaced forty-five degrees apart; hence, the reason for spacing the electrode structures 20 forty-five degrees apart as shown in FIGS. 1 and 3. Sensing electrodes are positioned adjacent the four nodes of the ring 14 to capacitively sense the radial and tangential motion of the ring 14. If the resonating ring 14 is not subject to any rotation, capacitance between the ring 14 and the sensing electrodes next to the nodes will not change since there is no radial motion at the nodes in the primary vibration mode, and therefore no rate signal. However, when the ring 14 is subjected to rotation, or angular rate, the Coriolis force will transfer energy from the primary vibration mode to the second vibration mode, which is forty-five degrees apart from the primary mode. The deflection of the second vibration mode changes the gap between the ring 14 and the sensing electrodes at the nodes, changing the capacitance and generating a rate signal.

Sensors of the type described above are capable of extremely precise measurements, and are therefore desirable for use in automotive applications. However, further research has shown that mode shapes of sensing rings supported by springs configured as shown in FIGS. 1 and 3 deviate from the symmetrically elliptical mode shape of an ideal ring. Mode shape distortion causes the nodes to shift and, in the case of the sensor taught by Zarabadi et al., has been found to induce a rocking motion in the interdigitized features at the antinodes, which limits the performance of the sensor and can lead to sticking of the interdigitized features.

The impact of node shift on sensor performance can be seen from a comparison of FIGS. 4 and 5, which are maximum deflection plots of an ideal ring at flexural mode (based on finite element analysis (FEA)) and the sensor ring 14 of Putty et al. As seen from FIG. 4, the ideal ring has only radial deflection (identified as UR) at the antinodes (0, 90, 180 and 270 degrees) and only tangential deflection (identified as UTHETA) at the nodes (45, 135, 225 and 315 degrees), as discussed above. The node shift observed in FIG. 5 is the result of the symmetrical elliptical mode shapes of the ideal ring being greatly distorted by the springs 16 of the sensor 10. The antinodes (where no tangential deflection occurs) and the nodes (where no radial deflection occurs) are no longer forty-five degrees apart. Consequently, the nodes are not aligned with the sensing electrodes at the 45, 135, 225 and 315-degree positions around the ring 14, with the result that radial deflection of the ring 14 occurs at the sensing electrodes and a capacitance change or offset is sensed by the sensing electrodes even though the gyroscope is not subjected to angular rotation. If a balance mechanism is used to align the nodes with the sensing electrodes located at 45, 135, 225 and 315 degrees, the antinodes will be shifted away, and sensing electrodes located at 0, 90, 180 and 270 degrees will see tangential motion in addition to radial motion. This additional motion distorts the signal picked up at the electrodes, increases the 2× frequency signal and total harmonic distortion (THD), and makes the task of calibrating the gyroscope difficult. Finally, and as noted above, if the interdigitized features of Zarabadi's sensor are present, the tangential motion of the ring 14 can also cause the features to rock and stick.

Therefore, it would be highly desirable if further advancements could be made toward improving the performance and durability of motion sensors having resonance ring gyroscopes of the type described above.

SUMMARY OF THE INVENTION

According to the present invention, there is provided a motion sensor having a sensing ring and electrodes formed on or in a surface region of a substrate, such as a silicon chip. The sensing ring is supported above the substrate by a number of spring members extending radially from a hub, so that the ring has an axis of rotation through the hub. The electrodes are formed to closely surround the ring, with some of the electrodes being adapted to induce vibration in the ring, while others detect angular and radial deflections of the ring. Finally, the spring members are substantially S-shaped with substantially C-shaped first and second portions. The first portion of each spring member has a larger radius of curvature than its corresponding second portion.

According to this invention, configuring the spring members to have two portions of different radii of curvature has been shown to substantially produce in the sensing ring the elliptical vibration mode shape of an ideal ring, such that the sensor's performance is improved. More particularly, the nodes and antinodes of the sensing ring are restored to positions of forty-five degrees apart, which allows for accurately placement of sensing electrodes at the nodes and antinodes. Achievement of an elliptical vibration mode shape in the ring also reduces distortion of the sensor signal, and simplifies calibration of the sensor. According to this invention, optimization of the mode shape can be achieved as a function of the radius of the sensing ring, the radius of the hub, and the number of spring elements used to support the sensing ring.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 6:
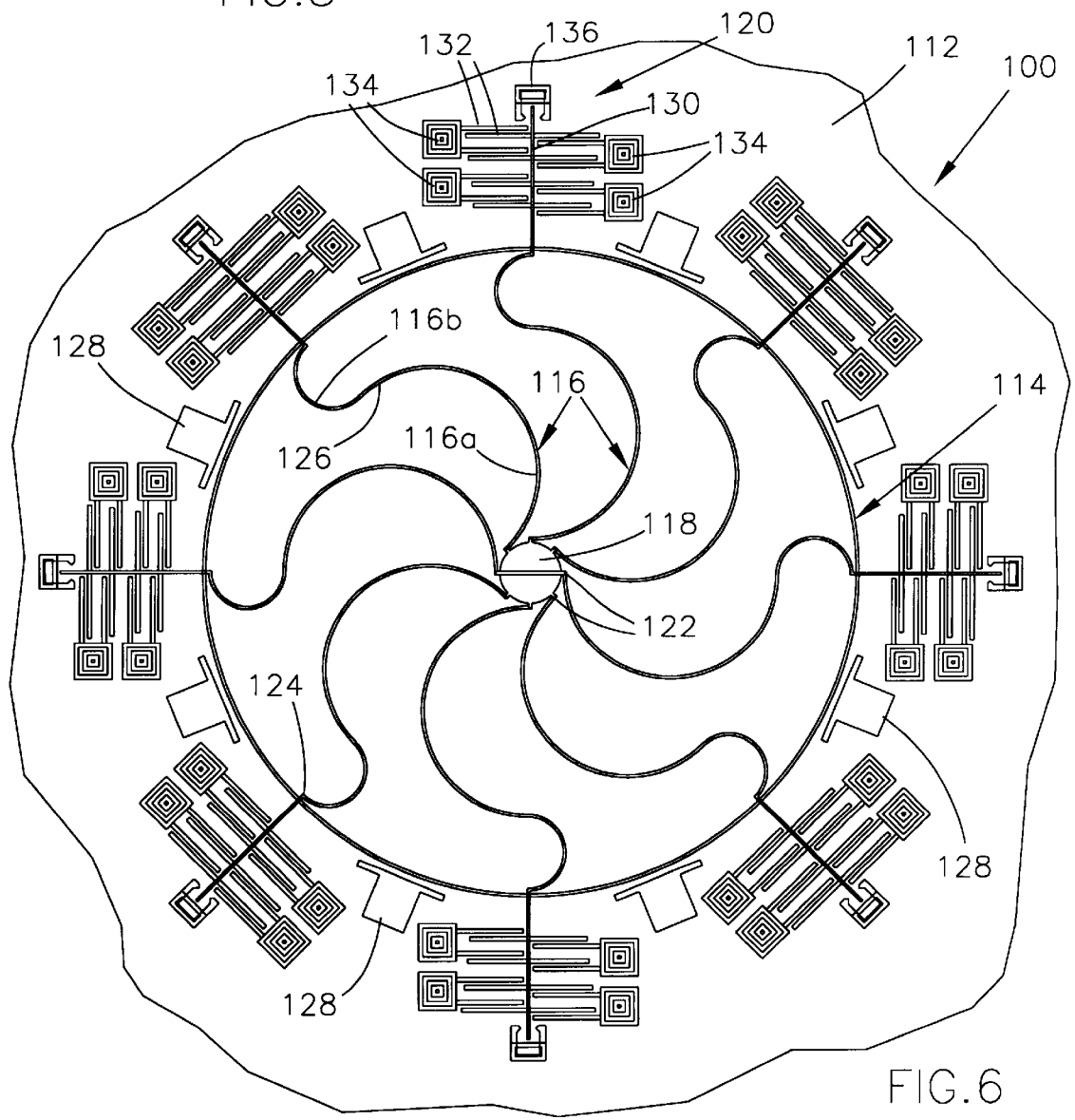
FIG. 6 is a plan view of a resonance ring gyroscope for a motion sensor in accordance with this invention.

FIG. 6 represents a motion sensor 100 having a sensing structure in the form of a resonance ring gyroscope in accordance with the present invention. While the sensor 100 will be described particularly as being an angular rate motion sensor, those skilled in the art will appreciate that the sensor 100 could also operate as an acceleration sensor.

As illustrated, the sensor 100 is formed on a sensing wafer 112. The sensing structure of the sensor 100 includes a ring 114 that is supported by a number of arcuate springs 116 radially extending from a center post or hub 118. The springs 116 are shown as having two distinct arcuate portions 116a and 116b that are connected to the hub 118 and ring 114 with tethers 122 and 124, respectively. Each of the tethers 122 and 124 is oriented in a radial direction relative to the hub 118, and separate the opposite ends of the springs 116 from the ring 114 and the hub 118. The ring 114, springs 116, hub 118 and tethers 122 and 124 may be an all-silicon monolithic structure in accordance with U.S. Pat. No. 5,547,093 to Sparks or a plated metal surface micromachine in accordance with U.S. Pat. No. 5,450,751 to Putty et al., both of which are incorporated herein by reference.

As shown in FIG. 6, the ring 114 is surrounded by a number of electrode structures 120 formed on the wafer 112. As shown, the electrode structures 120 define an equi-angularly spaced electrode pattern in close proximity to the perimeter of the ring 114, with adjacent electrode structures 120 being spaced forty-five degrees apart. The ring 114 and the electrodes 120 are formed to be electrically conductive, which enables the ring 114 to form capacitors with the electrode structures 120 when a voltage potential is present. As with the sensor of Putty et al., the electrode structures 120 include drive and sensing electrodes. In the preferred embodiment shown in FIG. 6, the electrode structures 120 are configured in accordance with U.S. Pat. No. 5,872,313 to Zarabadi et al., which is incorporated herein by reference. According to Zarabadi et al., bases 130 extend radially from the ring 114 between pairs of electrodes 134 of the electrode structures 120. Multiple pairs of interdigitized teeth 132 extend perpendicularly from the base 130 toward the electrodes 134 and from the electrodes 134 toward the base 130. The base 130 and its associated teeth 132 are subjected to the same rotary movement as the ring 114, while the remaining teeth 132 are stationary with the electrodes 134. The electrodes 134 of the electrode structures 120 are adapted to be either drive electrodes that drive the ring 114 into resonance when energized, or sensing electrodes to capacitively sense the proximity of the ring 114. As discussed in Zarabadi et al., the resonant/normal mode frequencies of the ring 114 exhibit minimal sensitivity to temperature variation as a result of the interdigitized teeth 132 of the base 130 and electrodes 134. Stops 136 limit the lateral movement of the base 130 and prevent the teeth 132 of the base 130 from contacting the surrounding electrode structure 120 due to excessive angular and/or linear acceleration of the ring 114. Also shown are balance electrodes 128 disposed equi-angularly around the perimeter of the ring 114, which when energized balance the resonant peaks of the rotary movement of the ring 114 by inducing stiffness in the ring 114 and springs 116. The ring 114, springs 116 and hub 118 are electrically insulated from the wafer 112, and electrically interconnected to allow an appropriate electrical potential to be established between the sensing structure and the electrodes 134 and 128 and stops 136.

With the above construction, the sensor 100 is able to detect angular velocity about the vertical axis of the ring 114 and, therefore, rotary movement about an axis of a body, such as an automobile, to which the sensor 100 is mounted. In accordance with Putty et al., Sparks and Zarabadi et al, conditioning circuitry (not shown) and differential driving and sensing techniques can be employed by the present invention. The operational requirements of the circuitry will be appreciated by those skilled in the art, and therefore will not be discussed in any detail here. It is sufficient to say that the performance of the sensor 100 is optimized by equiangularly placing the electrode structures 120 around the perimeter of the ring 114, and that symmetry of the sensor 100 is essential for its proper operation, as will be understood by those skilled in the art. In addition, at least two drive electrodes are required. However, other configurations are foreseeable, depending on the intended application and operating natural mode of the device. Finally, the performance of the sensor 100 is generally enhanced by increasing the number of sensing electrodes present.

Figure 1:
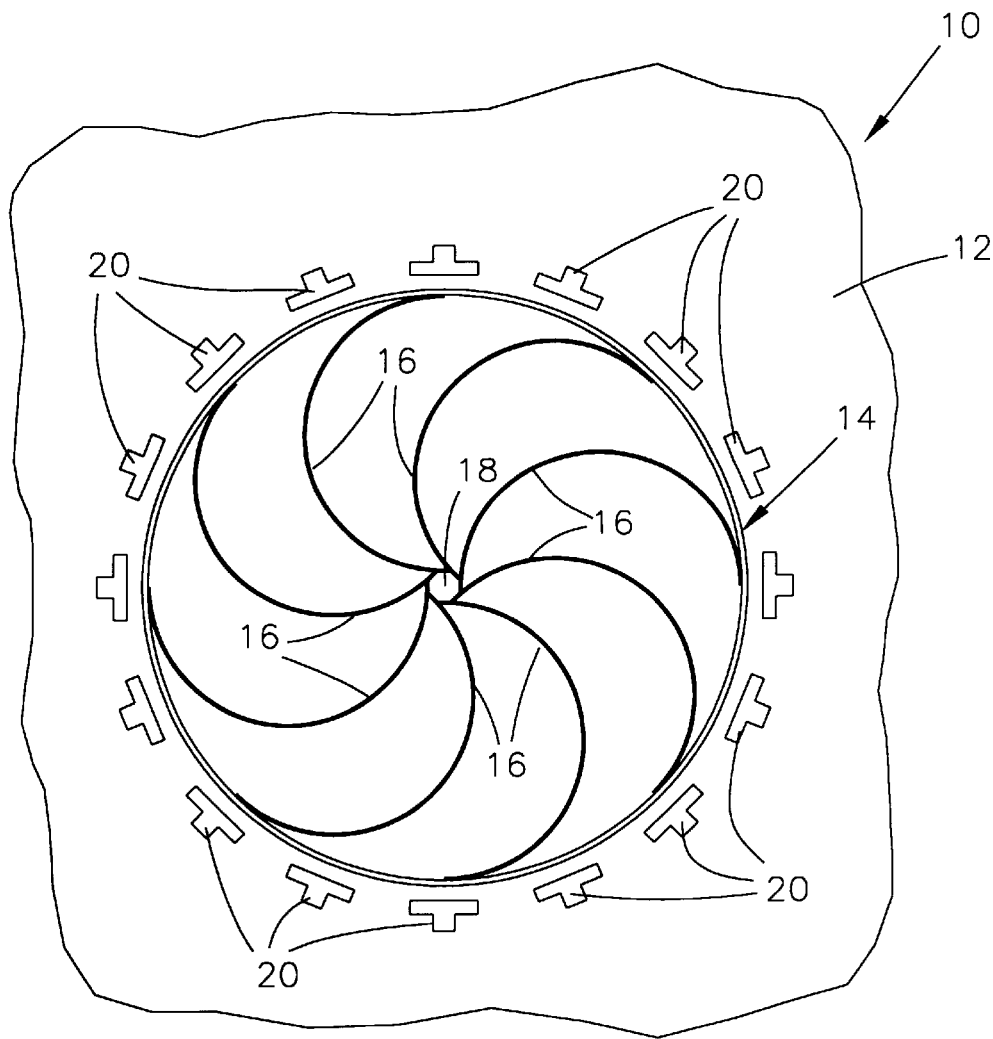
FIGS. 1 and 2 are plan and cross-sectional views of a resonance ring gyroscope of a type used in an angular rate motion sensor in accordance with the prior art.
Figure 2:
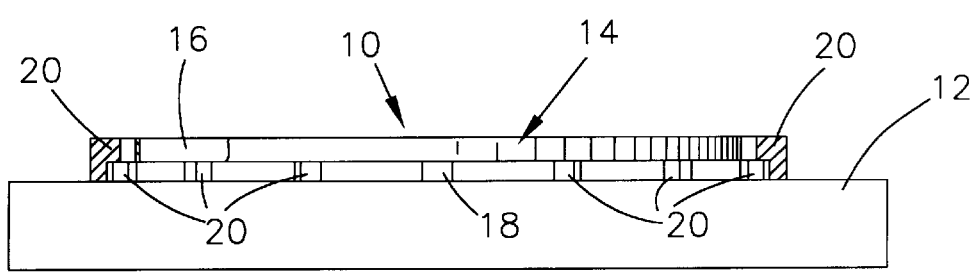
Figure 3:
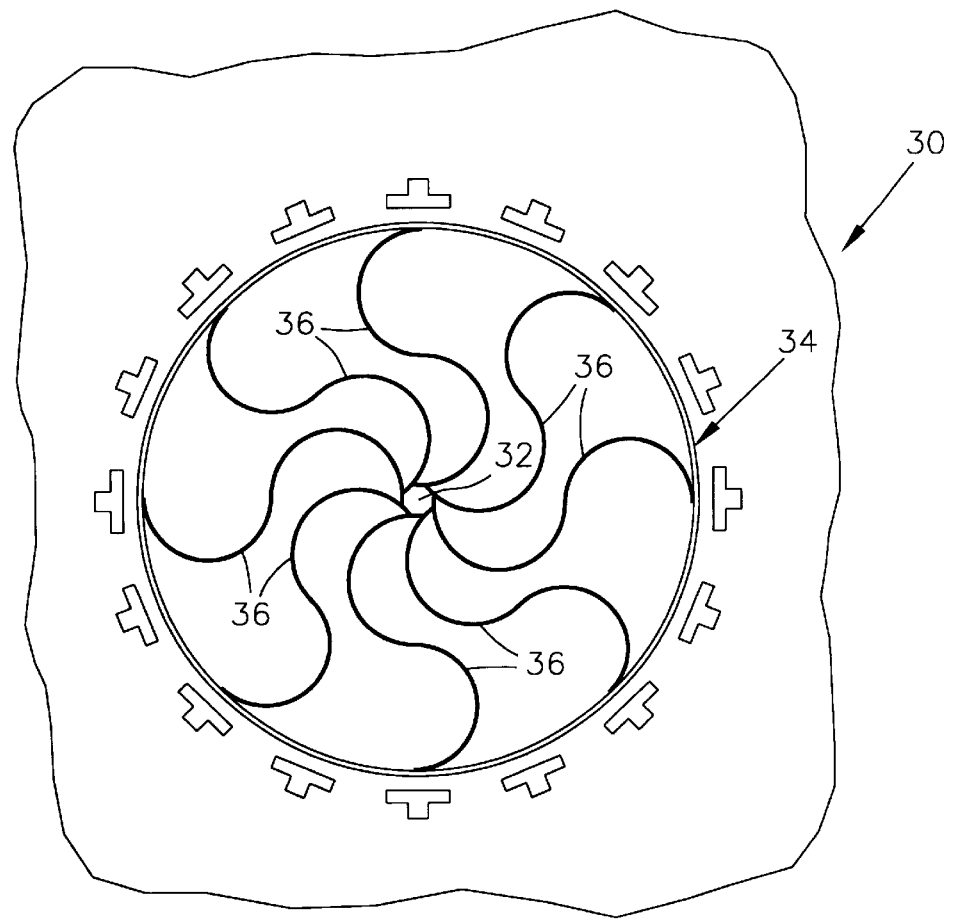
FIG. 3 is a plan view of a second resonance ring gyroscope of the prior art.

According to this invention, the springs 116 are neither simply S-shaped nor C-shaped as taught by the prior art of FIGS. 1 and 3. Instead, each spring is S-shaped with the two half-circle shaped portions 116a and 116b, which meet roughly at point 126 on each spring 116. Importantly, the portions 116A and 116B have different radii of curvature. In FIG. 6, the radius of the inner portions 116A is larger than the radius of the outer portions 116B, though the opposite could be true. Of importance is that the ratio of the radii of the portions 116a and 116b is other than one, with an optimum ratio being dependent on several factors as noted below. As shown in FIG. 6, the radii of the larger portions 116A are substantially the same, as are the radii of the smaller portions 116B.

According to this invention, the presence on the springs 116 of the two half-circle portions 116A and 116B of different radii prevents or at least reduces the mode shape distortion of the ring 114 associated with the springs 16 and 36 of FIGS. 1 and 3. The ratio of the radii can be optimized to yield an elliptical mode shape for the ring 114 that is very nearly that of an ideal ring by factoring in the radii of the ring 114 and hub 118 and the lengths of the tethers 122 and 124, as well as the number of springs 116, the number and geometry of the interdigitized teeth 132, and material properties of the sensing structure, such as modulus of elasticity, poisson's ratio, etc. Due to the complexity of the sensor structure, numerical methods such as finite element analysis (FEA) are preferably used to determine the optimum ratio for the radii of the portions 116a and 116b.

Figure 4:
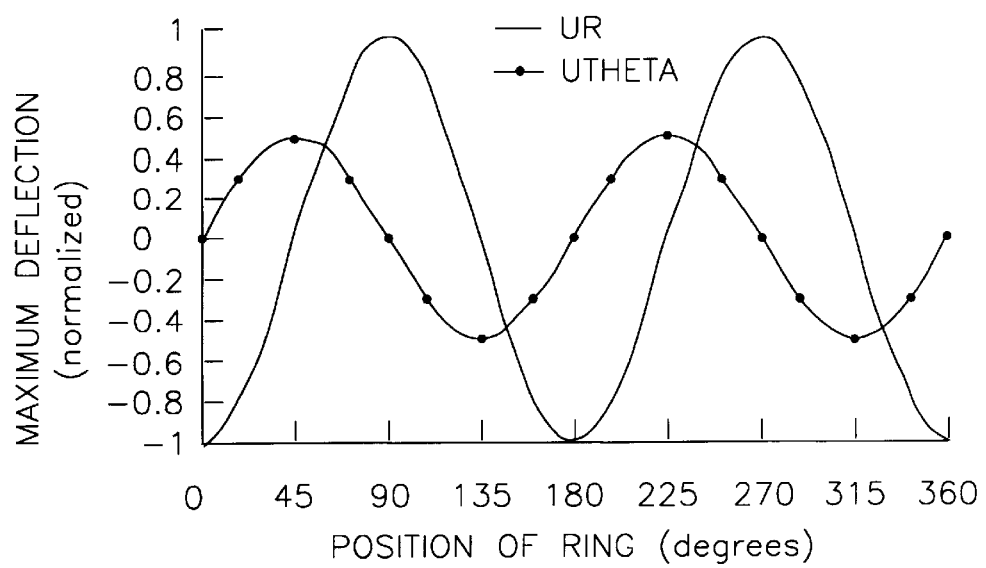
FIGS. 4 and 5 are graphs of the maximum radial and angular deflections at flexural mode of an ideal sensing ring and the sensor of FIG. 1, respectively.
Figure 5:
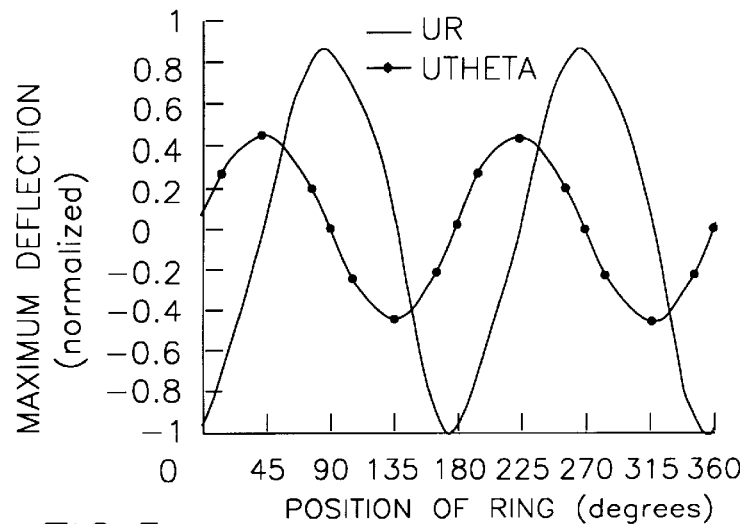
Figure 7:
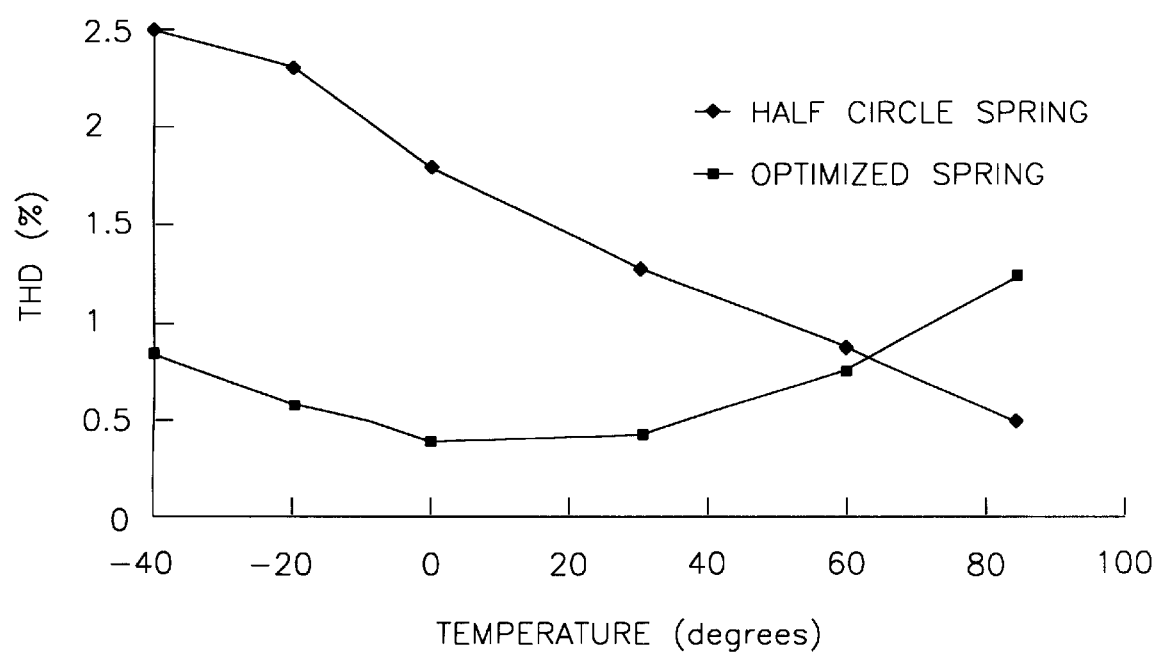
FIG. 7 is a graph comparing the total harmonic distortion characteristics of the gyroscopes of FIGS. 1 and 6.

In one embodiment of this invention, an optimum ratio of the portions 116A to the portions 116B was about 3.28:1 for a nickel ring 114 having a radius of about 425 micrometers, a hub radius of about 50 micrometers, tether lengths of about 10 micrometers, and eight sets of interdigitized teeth 132. The vibration mode of this sensor was shown to be essentially identical to that for the ideal ring shown in FIG. 4. In other words, only tangential deflection of the ring 114 occurred at the nodes spaced forty-five degrees apart (e.g., the 45, 135, 225 and 315-degree positions around the ring 114). At the antinodes (the 0, 90, 180 and 270-degree positions), only radial motion occurred, evidencing that the nodes and antinodes were angular spaced at forty-five degree intervals around the perimeter of the ring 114. As represented in FIG. 7, which compares the total harmonic distortion (THD) of the sensor 100 of FIG. 6 (identified as the OPTIMIZED SPRING) and the prior art sensor 10 of FIG. 1 (identified as the HALF CIRCLE SPRING), THD of the sensor 100 relative to temperature was considerably less than that of the sensor 10 as a result of tangential motion at the antinodes being essentially eliminated.

From the above, it can be seen that the springs 116 of this invention are able to significantly enhancing the performance of a motion sensor by substantially achieving the elliptical mode shape of an ideal ring in a resonance ring gyroscope. While conventional silicon processing materials and techniques can be employed to form the sensor 100 of this invention, including all of the structural features of the sensing structure and the electrode structures 120, other materials and processing techniques can be used. In addition, while a particular configuration is shown for the ring 114, springs 116, and electrode structures 120, various modifications could be made by one skilled in the art. Finally, it is foreseeable that the present invention can be utilized to encompass a multitude of applications through the addition or substitution of other processing or sensing technologies.

Therefore, while the invention has been described in terms of a preferred embodiment, other forms could be adopted by one skilled in the art. Accordingly, the scope of the invention is to be limited only by the following claims.

What is claimed is:

1. A motion sensor comprising:

a substrate;

a hub supported by the substrate;

spring members extending radially from the hub, the spring members being substantially S-shaped with substantially C-shaped first and second portions having different radii of curvature;

a sensing ring supported by the spring members above the substrate so that the sensing ring has an axis of rotation substantially through the hub;

means for inducing vibration in the sensing ring; and means for sensing angular and radial deflections of the sensing ring.

2. A motion sensor as recited in claim 1, wherein the first portion of each of the spring members is adjacent the hub and the second portion of each of the spring members is adjacent the sensing ring.

3. A motion sensor as recited in claim 2, wherein the radius of each of the first portions is larger than the radius of each of the second portions.

4. A motion sensor as recited in claim 1, wherein the radii of the first portions of the spring members are substantially the same, and wherein the radii of the second portions of the spring members are substantially the same.

5. A motion sensor as recited in claim 1, further comprising tethers between the hub and the spring members and tethers between the spring members and the sensing ring.

6. A motion sensor as recited in claim 5, wherein each of the tethers is oriented substantially radially relative to the hub.

7. A motion sensor as recited in claim 1, wherein the inducing means comprises a first plurality of electrode structures and the sensing means comprises a second plurality of electrode structures, and each of the first and second plurality of electrodes structures is outside the sensing ring.

8. A motion sensor as recited in claim 7, wherein each electrode structure of the first and second plurality of electrode structures comprises:

a base member extending radially from the sensing ring;

first and second members extending perpendicularly from the base member;

a first electrode adjacent the first member; and a second electrode adjacent the second member.

9. A motion sensor as recited in claim 8, wherein:

the sensing means senses a capacitive force between the first electrode and the first member and a capacitive force between the second electrode and the second member of the second plurality of electrode structures of the sensing means; and the inducing means causes the first and second electrodes of the first plurality of electrode structures of the inducing means to induce vibration in the sensing ring near a resonant frequency of the sensing ring.

10. An angular rate sensor comprising:

a substrate;

a hub supported by the substrate;

spring members extending radially from the hub, each of the spring members being substantially S-shaped with substantially C-shaped first and second portions having different radii of curvature;

an electrically-conductive sensing ring supported above the substrate by the spring members so as to have an axis of rotation through the hub;

means for inducing vibration in the sensing ring, the sensing ring having two identical vibration modes of elliptical shape when induced to vibrate by the inducing means; and means for sensing angular and radial deflections of the sensing ring.

11. An angular rate sensor as recited in claim 10, wherein the first portion of each of the spring members is adjacent the hub and the second portion of each of the spring members is adjacent the sensing ring.

12. An angular rate sensor as recited in claim 11, wherein the radius of each of the first portions is larger than the radius of each of the second portions.

13. An angular rate sensor as recited in claim 10, wherein the radii of the first portions of the spring members are substantially the same, and wherein the radii of the second portions of the spring members are substantially the same.

14. An angular rate sensor as recited in claim 10, further comprising tethers between the hub and the spring members and tethers between the spring members and the sensing ring, the tethers being oriented substantially radially relative to the hub.

15. An angular rate sensor as recited in claim 10, wherein at least four pairs of diametrically-opposed electrode structures define the inducing means and the sensing means, the electrode structures being located equi-angularly around the sensing ring.

16. An angular rate sensor as recited in claim 15, wherein each electrode structure comprises:

a base member extending radially from the sensing ring, the base member having opposing sides;

a first pair of teeth extending perpendicularly from a first side of the base member;

a second pair of teeth extending perpendicularly from a second side of the base member opposite the first pair of teeth;

a first pair of electrodes interdigitized with the first pair of teeth; and a second pair of electrodes interdigitized with the second pair of teeth.

17. An angular rate sensor as recited in claim 16, wherein:

the sensing means senses capacitive forces between the first pair of electrodes and the first pair of teeth and between the second pair of electrodes and the second pair of teeth of at least two of the electrode structures; and the inducing means applies a voltage to the first and second pair of electrodes of at least one of the electrode structures so as to induce vibration in the sensing ring near a resonant frequency of the sensing ring.

18. A resonance ring gyroscope of an angular rate sensor, the resonance ring gyroscope comprising:

a substrate;

a hub on the substrate;

an electrically-conductive sensing ring supported above the substrate and around the hub so as to have an axis of rotation through the hub;

spring members extending radially from the hub and connected to the sensing ring for supporting the sensing ring above the substrate, each of the spring members being substantially S-shaped with a substantially C-shaped first portion adjacent the hub and a substantially C-shaped second portion adjacent the sensing ring, the radii of the first portions of the spring members being substantially the same and the radii of the second portions of the spring members being substantially the same, the radius of the first portion of each spring member larger than the radius of the corresponding second portion of the same spring member;

tethers between the hub and the spring members and tethers between the spring members and the sensing ring, the tethers being oriented substantially radially relative to the hub;

at least four pairs of diametrically-opposed electrode structures located equi-angularly around the sensing ring, each electrode structure comprising:

a base member extending radially from the sensing ring, the base member having opposing sides;

a first pair of teeth extending perpendicularly from a first side of the base member;

a second pair of teeth extending perpendicularly from a second side of the base member opposite the first pair of teeth;

a first pair of electrodes interdigitized with the first pair of teeth; and a second pair of electrodes interdigitized with the second pair of teeth;

means for sensing capacitive forces between the first pair of electrodes and the first pair of teeth and between the second pair of electrodes and the second pair of teeth of at least two of the electrode structures; and means for applying a voltage to the first and second pair of electrodes of at least one of the electrode structures so as to induce vibration in the sensing ring near a resonant frequency of the sensing ring, the sensing ring having two identical modes of elliptical shape.

* * * * *